United States Patent
Kichise

(10) Patent No.: US 9,174,668 B2
(45) Date of Patent: Nov. 3, 2015

(54) ELECTRIC POWER STEERING SYSTEM

(71) Applicant: JTEKT CORPORATION, Osaka-shi, Osaka (JP)

(72) Inventor: Hiroshi Kichise, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/190,772

(22) Filed: Feb. 26, 2014

(65) Prior Publication Data

US 2014/0257642 A1 Sep. 11, 2014

(30) Foreign Application Priority Data

Mar. 5, 2013 (JP) ................................. 2013-043348

(51) Int. Cl.
  *B62D 5/04* (2006.01)
  *B62D 15/02* (2006.01)

(52) U.S. Cl.
  CPC ............ *B62D 5/0463* (2013.01); *B62D 5/0409* (2013.01); *B62D 5/0496* (2013.01); *B62D 15/0235* (2013.01)

(58) Field of Classification Search
  None
  See application file for complete search history.

(56) References Cited

U.S. PATENT DOCUMENTS

| | | | | |
|---|---|---|---|---|
| 4,611,682 A | * | 9/1986 | Yasuda et al. | 180/446 |
| 4,771,843 A | * | 9/1988 | Shimizu | 180/446 |
| 4,771,845 A | * | 9/1988 | Shimizu | 180/446 |
| 4,789,040 A | * | 12/1988 | Morishita et al. | 180/446 |
| 4,800,974 A | * | 1/1989 | Wand et al. | 180/446 |
| 2001/0026134 A1 | * | 10/2001 | Fukumoto et al. | 318/430 |
| 2001/0038661 A1 | * | 11/2001 | Mori et al. | 374/45 |
| 2002/0179363 A1 | * | 12/2002 | Takatsuka et al. | 180/446 |
| 2003/0071594 A1 | * | 4/2003 | Kleinau et al. | 318/567 |
| 2003/0076061 A1 | * | 4/2003 | Kleinau et al. | 318/432 |
| 2003/0076065 A1 | * | 4/2003 | Shafer et al. | 318/567 |
| 2003/0079932 A1 | * | 5/2003 | Ono et al. | 180/407 |
| 2004/0159489 A1 | * | 8/2004 | Toda et al. | 180/446 |
| 2004/0227481 A1 | * | 11/2004 | Hayashi | 318/434 |
| 2005/0257986 A1 | * | 11/2005 | Kagei | 180/404 |
| 2005/0269150 A1 | * | 12/2005 | Fujimoto et al. | 180/446 |
| 2006/0201736 A1 | * | 9/2006 | Fardoun et al. | 180/446 |
| 2007/0227805 A1 | * | 10/2007 | Walz | 180/446 |
| 2007/0247766 A1 | * | 10/2007 | Zeniya et al. | 361/25 |
| 2008/0024080 A1 | * | 1/2008 | Ogawa | 318/432 |
| 2008/0048591 A1 | * | 2/2008 | Hamada et al. | 318/9 |
| 2008/0217098 A1 | * | 9/2008 | Takeuchi et al. | 180/446 |
| 2009/0200098 A1 | * | 8/2009 | Inoue et al. | 180/446 |

(Continued)

FOREIGN PATENT DOCUMENTS

| | | |
|---|---|---|
| EP | 1 304 276 A1 | 4/2003 |
| JP | A-2010-030469 | 2/2010 |
| WO | WO 2008/032197 A1 | 3/2008 |

OTHER PUBLICATIONS

Jun. 10, 2014 Extended European Search Report issued in European Application No. 14 15 6933.

*Primary Examiner* — Mussa A Shaawat
(74) *Attorney, Agent, or Firm* — Oliff PLC

(57) ABSTRACT

In an electric power steering system, an ECU calculates a steering angle of a steering wheel based on an output of a rotation angle sensor and an EPS gear ratio. The ECU calculates a correction amount for canceling a steering deviation caused due to a temperature change, based on a temperature of a rack shaft detected by a temperature sensor and a map stored in a memory, and corrects the correction amount by adding the correction amount to the calculated steering angle.

2 Claims, 2 Drawing Sheets

(56) References Cited

U.S. PATENT DOCUMENTS

| | | |
|---|---|---|
| 2010/0030427 A1 | 2/2010 | Mitsuhara et al. |
| 2011/0066330 A1* | 3/2011 | Kim ................................ 701/42 |
| 2011/0101904 A1* | 5/2011 | Sakamoto .................... 318/473 |
| 2011/0160965 A1* | 6/2011 | Oh ................................. 701/42 |
| 2011/0178681 A1* | 7/2011 | Gu ................................. 701/42 |
| 2012/0101683 A1* | 4/2012 | Nishimura ..................... 701/41 |
| 2013/0033210 A1* | 2/2013 | Suzuki et al. ............ 318/400.22 |
| 2013/0066524 A1* | 3/2013 | Kitazume ...................... 701/42 |
| 2013/0285587 A1* | 10/2013 | Takemoto et al. ............ 318/473 |
| 2014/0195119 A1* | 7/2014 | Kouichi et al. ................. 701/41 |
| 2014/0210394 A1* | 7/2014 | Kuehnhoefer et al. ....... 318/634 |
| 2014/0257642 A1* | 9/2014 | Kichise ........................... 701/42 |
| 2014/0350762 A1* | 11/2014 | Wesenberg et al. ............ 701/22 |

\* cited by examiner

ELECTRIC POWER STEERING SYSTEM

INCORPORATION BY REFERENCE

The disclosure of Japanese Patent Application No. 2013-043348 filed on Mar. 5, 2013 including the specification, drawings and abstract, is incorporated herein by reference in its entirety.

BACKGROUND OF THE INVENTION

1. Field of the Invention

The invention relates to a rack assist type electric power steering system.

2. Description of Related Art

In a conventional rack assist type electric power steering system, since the coefficient of expansion of a rack shaft is different from the coefficient of expansion of a rack housing that accommodates the rack shaft, the rack shaft moves in a shaft length direction relative to the rack housing due to a change in an ambient temperature. Therefore, a detected rotation angle of a steering shaft is deviated with respect to the actual rotation angle by an amount corresponding to the amount of thermal displacement of the steering shaft. Therefore, in an electric power steering system described in, for example, Japanese Patent Application Publication No. 2010-30469 (JP 2010-30469 A), an ambient temperature around a steering mechanism is detected by a temperature sensor and the detected temperature is provided to a steering angle calculation portion. When the steering angle calculation portion calculates a steering angle by using the combination of a detection value obtained by a shaft angle detector and a detection value obtained by a motor angle detector that detects a rotation angle of a motor for steering angle assistance, the steering angle calculation portion corrects the detection value obtained by the shaft angle detector or the motor angle detector on the basis of a temperature detected by the temperature sensor and calculates the steering angle by using the corrected detection value.

In the system described in Japanese Patent Application Publication No. 2010-30469 (JP 2010-30469 A), correction is performed to cancel an amount of deviation between the detection value obtained by the shaft angle detector or the motor angle detector and the actual steering angle at the time when the ambient temperature around the rack shaft has changed. However, this correction is correction for correcting the number of turns of the steering shaft, that is, the number of revolutions (±1 revolution, ±2 revolutions, or the like) based on a steering angle middle point of the steering shaft, at the time when an initial steering angle is calculated. This correction is not correction for correcting the detection value obtained by the shaft angle detector or the motor angle detector during one rotation of the steering shaft. Therefore, the detection value obtained by the shaft angle detector or the motor angle detector still includes a deviation. Accordingly, the steering angle that is calculated on the basis of the detection value obtained by the shaft angle detector or the motor angle detector also includes a deviation.

SUMMARY OF THE INVENTION

An object of the invention is to provide an electric power steering system in which a steering angle can be calculated more accurately even when an ambient temperature has changed.

An electric power steering system according to an aspect of the invention includes a housing; a rack shaft that is accommodated in the housing, the rack shaft reciprocating in an axial direction in accordance with rotation of a steering shaft, and the rack shaft being formed of a material different from a material of which the housing is formed; an electric motor that is fixed to the housing and applies an assist force to the rack shaft; a rotation angle sensor that detects a rotation angle of the electric motor; a control portion that controls driving of the electric motor; and an estimate portion that estimates a temperature of the rack shaft or a characteristic value that depends on the temperature. The control portion calculates a steering angle of a steering wheel based on an output of the rotation angle sensor, determines a correction amount for canceling a deviation of the calculated steering angle or the output of the rotation angle sensor, based on an estimate result obtained by the estimate portion, and corrects the calculated steering angle or the output of the rotation angle sensor by taking into account the correction amount, the deviation being caused due to a change in an ambient temperature around the rack shaft.

With the configuration according to the above-described aspect, The control portion calculates the steering angle of the steering wheel based on the output of the rotation angle sensor, determines the correction amount for canceling the deviation of the calculated steering angle or the output of the rotation angle sensor, based on the estimate result obtained by the estimate portion, and corrects the calculated steering angle or the output of the rotation angle sensor by taking into account the correction amount, the deviation being caused due to the change in the ambient temperature around the rack shaft. Thus, it is possible to perform the correction to cancel the deviation of the steering angle of the steering wheel due to the change in the temperature of the rack shaft. Accordingly, even when the temperature of the rack shaft has changed, it is possible to determine the accurate steering angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
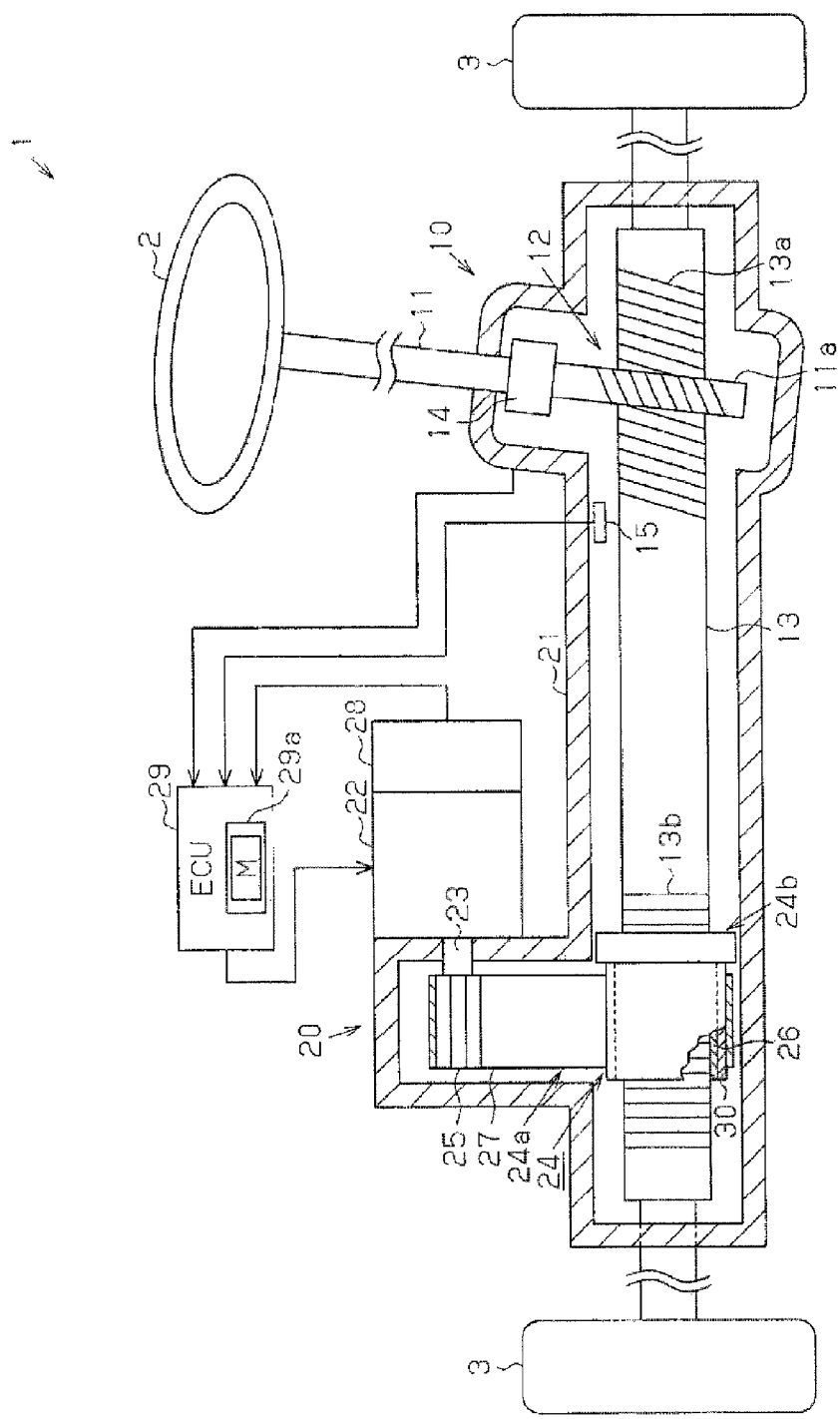
FIG. 1 is a sectional view showing a configuration of a steering system according to an embodiment of the invention.

Hereinafter, an embodiment of a rack assist type electric power steering system (EPS) will be described. As shown in FIG. 1, an EPS 1 includes a steering mechanism 10 that changes a steered angle of wheels 3 depending on the rotation of a steering wheel 2, and an assist mechanism 20 that assists the steering of the steering wheel 2.

The steering mechanism 10 includes a steering shaft 11 that is connected to the steering wheel 2, and a rack-and-pinion mechanism 12 to which the steering shaft 11 is connected. The rack-and-pinion mechanism 12 is accommodated in a housing 21 extending in the right-left direction of a vehicle body. The rack-and-pinion mechanism 12 includes a pinion shaft 11a provided at an end portion of the steering shaft 11 on the side opposite to the steering wheel 2, and a rack portion 13a provided at a portion of a rack shaft 13 extending in the right-left direction of the vehicle body. The wheels 3 are connected to respective ends of the rack shaft 13. Accordingly, the rotation of the steering wheel 2 is converted into an axial linear motion of the rack shaft 13 by the rack-and-pinion mechanism 12. Thus, the wheels 3 are steered. In addition, the housing 21 is formed of aluminum, and the rack shaft 13 is formed of steel.

The assist mechanism 20 includes a brushless motor 22 (hereinafter referred to as a motor 22) that generates an assist force, and a transmission mechanism 24 that transmits the driving force of the motor 22 to the rack shaft 13.

The motor 22 is fixed to the housing 21. An output shaft 23 of the motor 22 is parallel to the rack shaft 13. The transmission mechanism 24 includes a belt speed reducer 24a and a ball screw 24b. The ball screw 24b includes a ball screw portion 13b provided at a portion of the rack shaft 13, and a ball nut 26 screwed to the ball screw portion 13b with a plurality of balls (not shown) interposed therebetween. The belt speed reducer 24a includes a driving pulley 25 connected to the output shaft 23, a driven pulley 30 fixed to the ball nut 26, and a belt 27 that transmits the rotation of the driving pulley 25 to the driven pulley 30. Accordingly, the rotation force of the motor 22 is transmitted to the driven pulley 30 through the driving pulley 25 and the belt 27 and converted into the axial linear motion of the rack shaft 13 through the ball nut 26 that rotates together with the driven pulley 30.

Next, the electrical configuration of the EPS 1 will be described. The EPS 1 includes a torque sensor 14, a temperature sensor 15, a rotation angle sensor 28, and an ECU 29. The torque sensor 14 is provided at the steering shaft 11. The torque sensor 14 detects steering torque that is applied to the steering shaft 11 in accordance with a driver's steering operation. The temperature sensor 15 is provided inside the housing 21 at a position in the vicinity of the rack shaft 13. The rotation angle sensor 28 is provided in the motor 22, thereby detecting a rotation angle thereof.

The ECU 29 calculates a steering angle of the steering wheel 2 on the basis of a detection result from the rotation angle sensor 28 and an EPS gear ratio (a gear ratio between the rack portion 13a and the pinion shaft 11a and a speed reducing ratio of the transmission mechanism 24).

The coefficient of expansion of the rack shaft 13 formed of steel is different from the coefficient of expansion of the housing 21 formed of aluminum. Therefore, when the temperature of the rack shaft 13 has changed, the following problem occurs. A deviation occurs between a steering angle calculated on the basis of an output of the rotation angle sensor 28 for the motor 22 fixed to the housing 21 and the steering angle (the actual steering angle) of the steering wheel 2 connected to the rack shaft 13 supported in the housing 21 through the rack-and-pinion mechanism 12.

In order to cope with the caused deviation, the ECU 29 performs correction to cancel a deviation that is caused due to thermal displacement of the rack shaft 13, when calculating the steering angle. A map M used for performing correction to cancel the amount of change in the steering angle due to a change in the temperature of the rack shaft 13 is stored in advance in a memory 29a of the ECU 29.

The ECU 29 determines the amount of current (a current command value) that is supplied to the motor 22, on the basis of the corrected steering angle, a detection result obtained by the torque sensor 14, and the like. An electric current in accordance with the current command value is supplied to the motor 22, whereby the motor 22 generates appropriate assist torque at each moment.

In addition, the temperature sensor 15 corresponds to an estimate portion, and the memory 29a corresponds to a storage portion. Next, processing for correcting the steering angle performed by the ECU 29 will be described. The ECU 29 calculates the steering angle of the steering wheel 2 on the basis of the output of the rotation angle sensor 28 (a motor rotation angle) and the gear ratio of the rack portion 13a (the EPS gear ratio). Specifically, the steering angle is calculated by Equation 1 described below.

Steering angle=Motor rotation angle/EPS gear ratio    (Equation 1)

Figure 2:
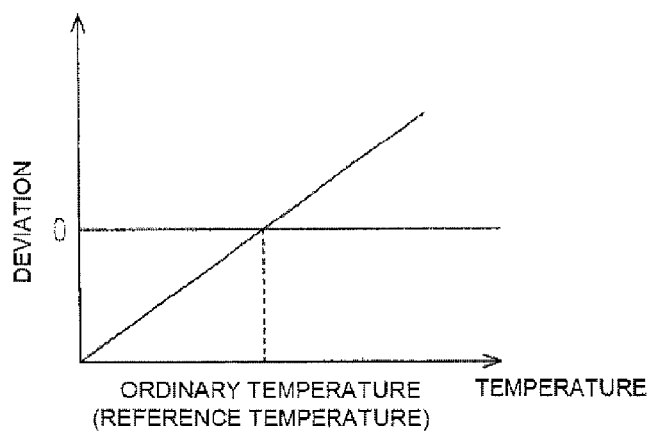
FIG. 2 is a graph showing a relation between a difference between a calculated steering angle and an actual steering angle of a steering wheel, and an ambient temperature in the embodiment.

There is the following correlation between the deviation that is a difference between the calculated steering angle and the actual steering angle, and the temperature of the rack shaft 13. For example, as shown in the graph of FIG. 2, when the deviation at an ordinary temperature (reference temperature) is set to be 0, the deviation increases as the temperature of the rack shaft 13 rises. The deviation similarly increases when the temperature decreases.

Figure 3:
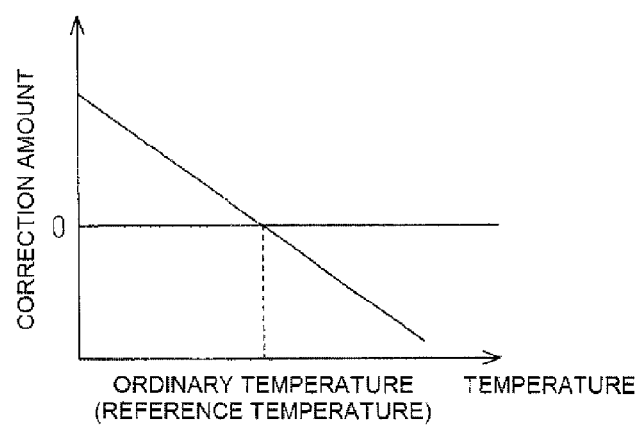
FIG. 3 is a map stored in a control portion in the embodiment, the map showing a relation between a coefficient (a steering angle change amount that changes depending on the ambient temperature) and a temperature.

In order to eliminate the steering angle deviation due to the change in the temperature of the rack shaft 13, the ECU 29 corrects the calculated steering angle by using the map M so as to cancel the deviation. As shown in FIG. 3, the map M shows a correlation between the temperature of the rack shaft 13 and a correction amount. The correction amount is obtained by calculating, in advance, a steering angle that is required to eliminate the deviation that is caused depending on the temperature. Next, as shown by Equation 2, the ECU 29 determines the correction amount corresponding to the detection result obtained by the temperature sensor 15 with the use of the map M, and performs correction by adding the correction amount to the steering angle calculated according to Equation 1 described above.

Steering angle=(Motor rotation angle/EPS gear ratio)+ Correction amount    (Equation 2)

Figure 4:
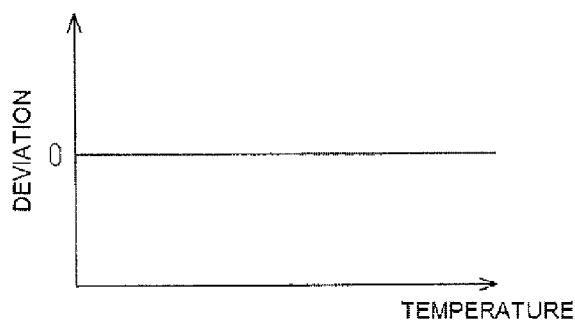
FIG. 4 is a graph showing a relation between a deviation after the steering angle is corrected by the control portion, and the temperature in the embodiment.

Thus, the ECU 29 can determine the accurate steering angle by correcting the calculated steering angle by using the amount of change in the steering angle, which is caused depending on the temperature of the rack shaft 13 (i.e., by using the correction amount). That is, as shown in FIG. 4, even if the temperature of the rack shaft 13 changes, it is possible to ensure the sufficient accuracy of the calculated steering angle, by reducing the deviation, which is the amount of deviation of the steering angle, to 0.

The embodiment described above has the following advantageous effects. The ECU 29 calculates the steering angle of the steering wheel 2 based on the output of the rotation angle sensor 28 and the EPS gear ratio. Subsequently, the ECU 29 corrects the calculated steering angle of the steering wheel 2 on the basis of the temperature of the rack shaft 13 (precisely, the temperature around the rack shaft 13), which is detected by the temperature sensor 15, and the map M stored in the memory 29a. Thus, it is possible to perform the correction to cancel the deviation between the steering angle of the steering wheel 2, that is, the steering angle calculated by the ECU 29 and the actual steering angle, the deviation being caused due to the change in the temperature of the rack shaft 13.

The calculated steering angle itself of the steering wheel 2 is corrected on the basis of the detection result obtained by the temperature sensor 15. Therefore, as compared to the conventional electric power steering system in which the number of turns (the number of revolutions) of the steering shaft is corrected when the initial steering angle is calculated, it is possible to determine the steering angle more accurately.

The ECU 29 corrects the calculated steering angle, every time the steering angle is calculated. Thus, even when a vehicle is in a state in which a temperature change is likely to occur, for example, when the vehicle is traveling at a low speed due to a traffic jam or the like, or when the vehicle that has been traveling stops and then immediately restarts traveling, it is possible to determine the accurate steering angle.

In addition, the embodiment described above can be implemented in the following forms in which the embodiment is appropriately changed. The ECU 29 may correct the output of the rotation angle sensor 28, instead of the calculated steering angle. This case is different from the embodiment only in that the motor rotation angle is corrected, and a correction method and the like in this case are the same as those in the embodiment, the description thereof will be omitted. The same effects as those described above are obtained by correcting the output of the rotation angle sensor 28, which is used to calculate the steering angle.

For example, a temperature sensor provided in the rotation angle sensor 28, or a temperature sensor provided in a Hall IC that is used for the torque sensor 14 may be used instead of the temperature sensor 15 in this embodiment. Since a temperature sensor provided in an existing sensor is used, it is not necessary to provide a new temperature sensor. Therefore, it is possible to reduce the cost of the steering system and simplify the configuration of the steering system.

The temperature may be estimated from not only the temperature sensor, but also the resistance value of a coil of the motor 22, for example. In this case, the temperature is estimated by using a characteristic in which the resistance value of the coil increases in direct proportion to a change in the temperature. That is, the temperature of the rack shaft 13 is estimated from the resistance value of the coil of the motor 22 that is present in the vicinity of the rack shaft 13. Then, the same steering angle correction as that in this embodiment is performed on the basis of the estimated temperature of the rack shaft 13. The resistance value of the coil corresponds to a characteristic value.

What is claimed is:

1. An electric power steering system comprising:
    a housing;
    a rack shaft accommodated in the housing, the rack shaft reciprocating in an axial direction in accordance with rotation of a steering shaft, and the rack shaft being formed of a material different from a material of which the housing is formed;
    an electric motor fixed to the housing and applying an assist force to the rack shaft;
    a rotation angle sensor configured to detect a rotation angle of the electric motor for a single rotation of the steering shaft;
    an estimator configured to estimate a temperature of the rack shaft or a characteristic value that depends on the temperature; and
    an electronic control unit configured to control driving of the electric motor by: (i) calculating a steering angle of a steering wheel for the single rotation of the steering shaft based on an output of the rotation angle sensor and an EPS gear ratio of the electric power steering system, (ii) determining a deviation amount between the calculated steering angle and an actual steering angle of the steering wheel caused by a change in an ambient temperature around the rack shaft, (iii) determining a correction amount for canceling the deviation of the calculated steering angle or the output of the rotation angle sensor based on the estimated temperature or the estimated characteristic value obtained by the estimator, and (iv) correcting the calculated steering angle or the output of the rotation angle sensor by applying the correction amount.

2. The electric power steering system according to claim 1, wherein
    estimator includes a temperature sensor disposed in a vicinity of the rack shaft,
    the electronic control unit includes a storage medium configured to store the map showing a correlation between the temperature of the rack shaft and the correction amount, and
    the electronic control unit is configured to: (i) determine the correction amount corresponding to the temperature at each moment based on the output of the temperature sensor and the map stored in the storage portion, and (ii) correct the calculated steering angle or the output of the rotation angle sensor by adding the correction amount to the calculated steering angle or the output of the rotation angle sensor.

* * * * *